US008890957B2

United States Patent
Lai et al.

(10) Patent No.: US 8,890,957 B2
(45) Date of Patent: Nov. 18, 2014

(54) METHOD, SYSTEM, COMPUTER PROGRAM PRODUCT AND COMPUTER-READABLE RECORDING MEDIUM FOR OBJECT TRACKING

(75) Inventors: Hsun-Feng Lai, Taipei (TW); Tzi-Cker Chiueh, Taipei (TW); Tse-Shih Chen, New Taipei (TW); Teng-Kai Fan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 390 days.

(21) Appl. No.: 13/338,271

(22) Filed: Dec. 28, 2011

(65) Prior Publication Data
US 2013/0162818 A1 Jun. 27, 2013

(30) Foreign Application Priority Data
Dec. 26, 2011 (TW) .............................. 100148625 A

(51) Int. Cl.
*H04N 7/18* (2006.01)

(52) U.S. Cl.
USPC .......................................... 348/169; 348/159

(58) Field of Classification Search
CPC .................. G06T 7/2093; G06T 2207/30232; H04N 7/18
USPC ........... 348/169–172, 153, 143, 159; 382/103
See application file for complete search history.

(56) References Cited

U.S. PATENT DOCUMENTS

| 4,692,806 | A | 9/1987 | Anderson et al. |
| 5,592,299 | A | 1/1997 | Boyce et al. |
| 6,295,367 | B1 * | 9/2001 | Crabtree et al. ............ 382/103 |
| 7,394,916 | B2 * | 7/2008 | Brodsky et al. ............ 382/103 |
| 7,450,735 | B1 * | 11/2008 | Shah et al. ................... 382/103 |
| 7,460,149 | B1 | 12/2008 | Donovan et al. |
| 7,620,207 | B2 * | 11/2009 | Brodsky et al. ............ 382/103 |
| 7,760,230 | B2 | 7/2010 | Russell et al. |
| 8,098,888 | B1 * | 1/2012 | Mummareddy et al. ...... 382/103 |
| 8,218,011 | B2 * | 7/2012 | Cheng et al. ................. 348/159 |
| 2002/0135695 | A1 | 9/2002 | Edelson et al. |

(Continued)

FOREIGN PATENT DOCUMENTS

| TW | 200714075 | 4/2007 |
| TW | 201104585 | 2/2011 |

OTHER PUBLICATIONS

"Notive of Allowance of Taiwan Counterpart Application", issued on Jun. 17, 2014, p. 1-p. 4, in which the listed references were cited.

*Primary Examiner* — David Harvey
(74) *Attorney, Agent, or Firm* — Jianq Chyun IP Office

(57) ABSTRACT

A method for object tracking is provided, which is suitable for retrieving and analyzing distributed surveillance data. The method for object tracking includes the following steps: determining a set of surveillance data corresponding to at least one initial object spot in a set of initial object spots according to a location and a time of the initial object spot; retrieving segments of surveillance data in the set of surveillance data; finding at least one discovered object spot matching a target object qualification in the set of surveillance data and adding the discovered object spot into a set of discovered object spots; setting the set of initial object spots to be the set of discovered object spots and repeating the aforementioned steps when the set of discovered object spots is not empty; and outputting the discovered object spot when the set of discovered object spots is empty.

21 Claims, 14 Drawing Sheets

(56) References Cited

U.S. PATENT DOCUMENTS

| | | | |
|---|---|---|---|
| 2003/0093810 A1 | 5/2003 | Taniguchi | |
| 2003/0133593 A1 | 7/2003 | Tullberg et al. | |
| 2005/0169367 A1 | 8/2005 | Venetianer et al. | |
| 2005/0265582 A1* | 12/2005 | Buehler et al. | 382/103 |
| 2005/0271251 A1 | 12/2005 | Russell et al. | |
| 2007/0047642 A1 | 3/2007 | Erlandson | |
| 2007/0282665 A1 | 12/2007 | Buehler et al. | |
| 2008/0292140 A1* | 11/2008 | Morris et al. | 382/103 |
| 2009/0274339 A9* | 11/2009 | Cohen et al. | 382/103 |
| 2010/0061624 A1 | 3/2010 | Cobb et al. | |
| 2011/0096149 A1 | 4/2011 | Au et al. | |
| 2011/0255739 A1 | 10/2011 | Lee et al. | |
| 2012/0120241 A1* | 5/2012 | Lewis et al. | 348/154 |
| 2012/0120248 A1* | 5/2012 | Han et al. | 348/169 |
| 2013/0050502 A1* | 2/2013 | Saito et al. | 348/169 |

* cited by examiner

METHOD, SYSTEM, COMPUTER PROGRAM PRODUCT AND COMPUTER-READABLE RECORDING MEDIUM FOR OBJECT TRACKING

CROSS-REFERENCE TO RELATED APPLICATION

This application claims the priority benefit of Taiwan application serial no. 100148625, filed on Dec. 26, 2011. The entirety of the above-mentioned patent application is hereby incorporated by reference herein and made a part of this specification.

BACKGROUND OF THE DISCLOSURE

1. Field of the Disclosure

The disclosure relates to a method, a system, a computer program product and a computer-readable recording medium for object tracking, which are adapted to a distributed storage environment.

2. Description of Related Art

Surveillance devices have a broad application potential, and can be used in applications to provide surveillance in communities, campus, building, customs, road intersection, highway traffic, boarder and automatic license plate recognition, etc. A large amount of surveillance cameras have been installed today on the street in many metropolitans over the world, and images captured by these surveillance cameras can be used for traffic accident investigation, criminal case investigation, etc.

In order to resolve inevitable omission and low efficiency caused by human eye examinations, smart surveillance systems have been developed to automatically analyze a plurality of images captured by the surveillance devices, so as to analyse and predict behaviours of target objects. It may include analysis stages of moving object detection, recognition, tracking, behaviour analysis and extraction, etc., which respectively belongs to domains of computer vision, pattern recognition, artificial intelligence and data management, etc.

The images captured by the aforementioned surveillance devices typically are stored separately, and have to be first collected to a central location of processing before they are analysed or interpreted.

For example, a car is stolen in the night at a certain city location, with thousands of surveillance devices on the street over the city, and the time of stealth uncertain, a naïve approach is to retrieve all images from all surveillance devices in the city over a night long duration before a license plate automatic recognition technique could be used to process and to find a stolen path of the target car. The total amount of surveillance data are huge and distributed across various storage devices on the streets. With mostly slow communication network between the image storage and the central monitoring location, it is not efficient if not possible to retrieve all data in real-time for analysis.

Similarly, surveillance based on audio recording also has the aforementioned problem.

SUMMARY OF THE DISCLOSURE

The disclosure is directed to a method, a system, a computer program product and a computer-readable recording medium for object tracking, which are adapted to a distributed surveillance data storage environment.

An embodiment of the disclosure provides a method for object tracking, which is adapted to an object tracking system, the method for object tracking includes the followings. A set of surveillance data corresponding to at least one initial object spot in a set of initial object spots is determined according to the location and the time of the initial object spot. One or a plurality of segments of surveillance data in the set of surveillance data is retrieved and analysed, of which output metadata are matched against target object qualifications. Any match is a discovered object spot. If any discovered object spot matching the target object qualification is found, it/they is/are added into a set of discovered object spots. If the set of initial object spots is not empty, the set of initial object spots is set to be the set of discovered object spots and the aforementioned steps are repeated.

The disclosure provides a computer program product, which is adapted to an object tracking system, and when the object tracking system loads and executes a computer program of the computer program product, the aforementioned method for object tracking is implemented.

The disclosure provides a non-transitory computer-readable recording medium, which stores a computer program, and when a computer loads and executes the computer program, the aforementioned method for object tracking is implemented.

An embodiment of the disclosure provides an object tracking system including a plurality of surveillance devices and an analyser. The analyser is coupled to the surveillance devices through a network. The analyser determines a set of surveillance data corresponding to at least one initial object spot in a set of initial object spots according to a location and a time of the initial object spot. The analyser retrieves one or a plurality of segments of surveillance data in the set of surveillance data from the surveillance devices. The analyser finds at least one discovered object spot from the set of surveillance data that matches the target object qualification, and adds all discovered object spot(s) into the set of discovered object spots. The analyser then sets the set of initial object spots to be the set of discovered object spots when it is not empty and repeats the aforementioned steps. The analyser outputs the set of discovered object spot(s) when the set of discovered object spots becomes empty.

According to the above descriptions, in the object tracking method, the object tracking system, and the corresponding computer program product and the computer-readable recording medium, the set of surveillance data to be retrieved for analysis is determined under the distributed surveillance data storage environment.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

To facilitate describing the disclosure, video or audio surveillance is taken as an example in embodiments of the disclosure, though the disclosure is not limited thereto.

Figure 1:
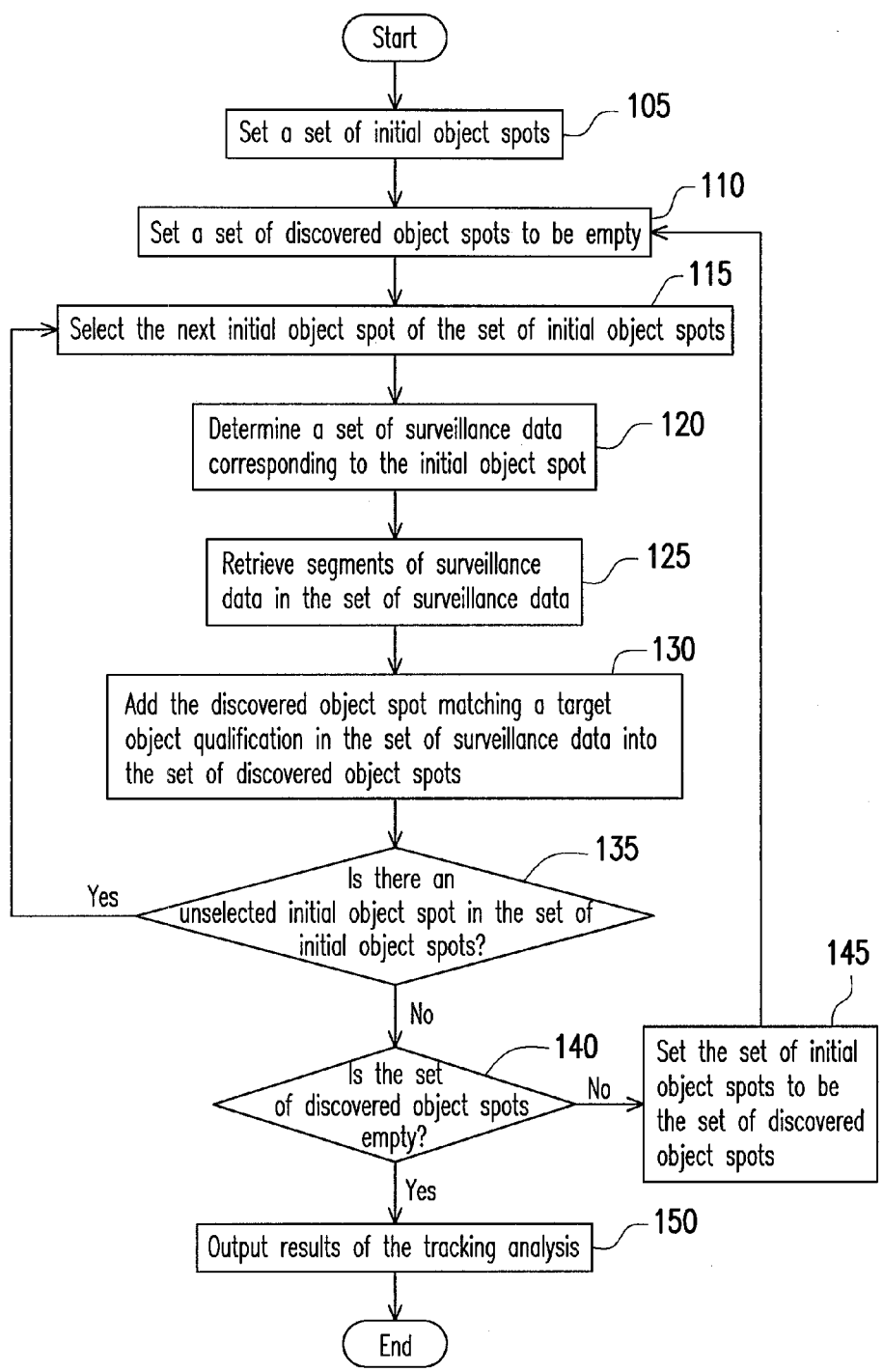
FIG. 1 is a flowchart illustrating a method for object tracking according to an embodiment of the disclosure.

FIG. 1 is a flowchart illustrating a method for object tracking according to an embodiment of the disclosure. The method for object tracking is adapted to an object tracking system in a distributed surveillance data storage environment, for example, an object tracking system 700 of FIG. 7. Generally, in the distributed storage environment, a plurality of surveillance devices constantly records surveillance data, and the surveillance data is separately stored in various surveillance devices or digital video recorders nearby the surveillance devices. In general, if object tracking analysis is to be performed, a cable or wireless network has to be used to retrieve the distributed surveillance data to a central analysis device for tracking analysis. Since a network bandwidth between a place storing the surveillance data and the analysis device is limited, retrieving of the large amount surveillance data requires a high bandwidth cost and a long transmission time, and one of possible effects of the method for object tracking of the embodiment is might to reduce a retrieving amount of the surveillance data as far as possible.

A target object tracked according to the tracking method can be any movable object such as a pedestrian, a motorcycle or a car, etc., and such object can move in a planar or spatial environment such as a public road system, a school, a store, a department store, a planar parking lot, a spatial parking lot, a residential or office building, etc. A plurality of surveillance devices is installed in the aforementioned planar or spatial environment to surveil surrounding moving objects, and record related surveillance data. The surveillance devices can be, for example, sound recorders or cameras. In case of the sound recorder, the surveillance data are audio data recorded by the sound recorder, and in case of the camera, the surveillance data is static picture data periodically captured by the camera or dynamic video data continuously captured by the camera.

FIG. 1 and FIG. 2A to FIG. 2C are used to describe method for object tracking method of the present embodiment. First, in step 105, a set of initial object spots is set. Obviously, the set of object spot is a set formed by the object spots. The set of initial object spots includes one or a plurality of initial object spots, where each of the initial object spots represents a start location and time that the target object starts to move, and the time of each of the initial object spots can be a single moment or a time range. If the set of initial object spots includes a plurality of initial object spots, it represents that the start location and time that the target object starts to move have multiple possibilities, and at least one of the initial object spots is required to be analysed.

The initial object spots in the set of initial object spots can be manually set by a user. Taking a campus car theft case of FIG. 2A as an example, in an electronic map 200 of the campus, each arrow represents a surveillance device and its surveillance direction, for example, the surveillance devices 231 and 232. The surveillance devices are, for example, video cameras, and an arrow direction represents the surveillance direction of a surveillance device. 1P to 11P represent eleven parking lots in the campus. A certain car parked in the parking lot 1P is stolen in a certain night. In this embodiment, the set of initial object spots only includes an initial object spot 210. A location of the initial object spot 210 is a parking location of the stolen car in the parking lot P1 in that night, and since a stolen time is uncertain, the user sets the time of the initial object spot 210 to the whole night, for example, from 7 a.m. to 6 p.m.

Then, in step 110, a set of discovered object spots used in a next round of analysis is set to an empty set. In step 115, a next initial object spot of the set of initial object spots is selected, where if the step 115 is executed for the first time, the first initial object spot of the set of initial object spots is selected.

Then, in step 120, a set of surveillance data corresponding to the initial object spot is determined according to the location and the time of the selected initial object spot. In step 125, one or a plurality of segments of surveillance data in the set of surveillance data is retrieved from the related surveillance devices. In step 130, try to find at least one discovered object spot matching a target object qualification in the set of surveillance data, where the discovered object spot found may be one or plural or none, and the discovered object spot found in the step 130 is added into a set of discovered object spots. In order to distinguish the object spots of the step 115 and the step 130, the object spot selected in the step 115 is referred to as the initial object spot, and the object spot found in the step 130 is referred to as the discovered object spot.

Each of the discovered object spots represents a location and time that the target object appears in a certain segment of surveillance data in the set of surveillance data. The time of each of the discovered object spots is a time when the target object appears in the segment of surveillance data where the discovered object spot belongs, and such time can be a single moment or a time range. The location of each of the discovered object spots may be a location where the target object appears in the segment of surveillance data where the discovered object spot belongs. When the surveillance data is static pictures or a dynamic video, image recognition techniques can be used to determine an appearance location of the target object. If the appearance location of the target object can be determined according to the surveillance data, the location of the surveillance device that has the segment of surveillance data where the discovered object spot belongs, i.e. the location of the surveillance device that records the segment of surveillance data is used to serve as the location of the discovered object spot.

In the method for object tracking of the present embodiment, each of the segments of surveillance data in the set of surveillance data is compared with the target object qualification to find all of the discovered object spots matching the target object qualification. The target object qualification is a set of information input in advance for identifying the target object. For example, a member of a fraud gang probably walks while talking to the victim through a mobile phone, and the conversation content is probably recorded by a surveillance device installed nearby. In this case, the surveillance data is audio data, and the target object qualification can be a series of numbers (for example, a bank account) or a specific tone such as begging or threat, etc. If the police wants to search a terrorist through the surveillance data, the target object qualification can be a secret language usually used by the terrorists, a time, a location or a target, etc. related to terrorist activities, or a combination thereof. The target object qualification can also be an audio characteristic such as a speaking pitch, speed or cadence of a target.

When the surveillance data is static pictures or a dynamic video, the target object qualification can be appearance characteristics of the target object. If the target object is people, the target object qualification can be a feature of a body shape, clothing or face, etc. If the target object is a vehicle such as a motorcycle or a car, the target object qualification can be a color or an appearance, etc., or a license plate number.

When the surveillance data is compared with the target object qualification, a recognition matching technique for audios, static pictures or dynamic videos is required, and presently a plurality of recognition matching techniques for audios, static pictures and dynamic videos has been developed, and details thereof are not introduced herein.

After the discovered object spot matching the target object qualification in the set of surveillance data is found, a step 135 is executed, by which it is checked whether there is unselected initial object spot in the set of initial object spots. If there is at least one unselected initial object spot, the flow returns to the step 115. If each of initial object spots in the set of initial object spots has been selected, in step 140, it is checked whether the set of discovered object spots is empty. If the set of discovered object spots is not empty, it represents that there are the discovered object spots required to be analysed for a next round, and step 145 is executed, by which the set of initial object spots is set to be the set of discovered object spots. Namely, the discovered object spots found in this round of analysis become the initial object spots of the next round of analysis, and then the flow returns to the step 110. If it is determined that the set of discovered object spots is empty in the step 140, in step 150, a tracking analysis result is output. The tracking analysis result may include the discovered object spots found in the step 130. A moving track of the target object can be obtained according to time and locations of the discovered object spots.

In another embodiment of the disclosure, the aforementioned method for object tracking can output a detailed tracking analysis result. According to the method for object tracking of the embodiment, the set of initial object spots is set in the step 105, and a set of discovered paths is set to be empty. Each time when a discovered object spot is found in the step 130, a discovered path defined by the discovered object spot and the initial object spot corresponding to the discovered object spot are added into the set of discovered paths, and then the set of discovered paths is output in the step 150. The discovered paths in the set of discovered paths can be connected as a moving track of the target object.

Figure 2A:
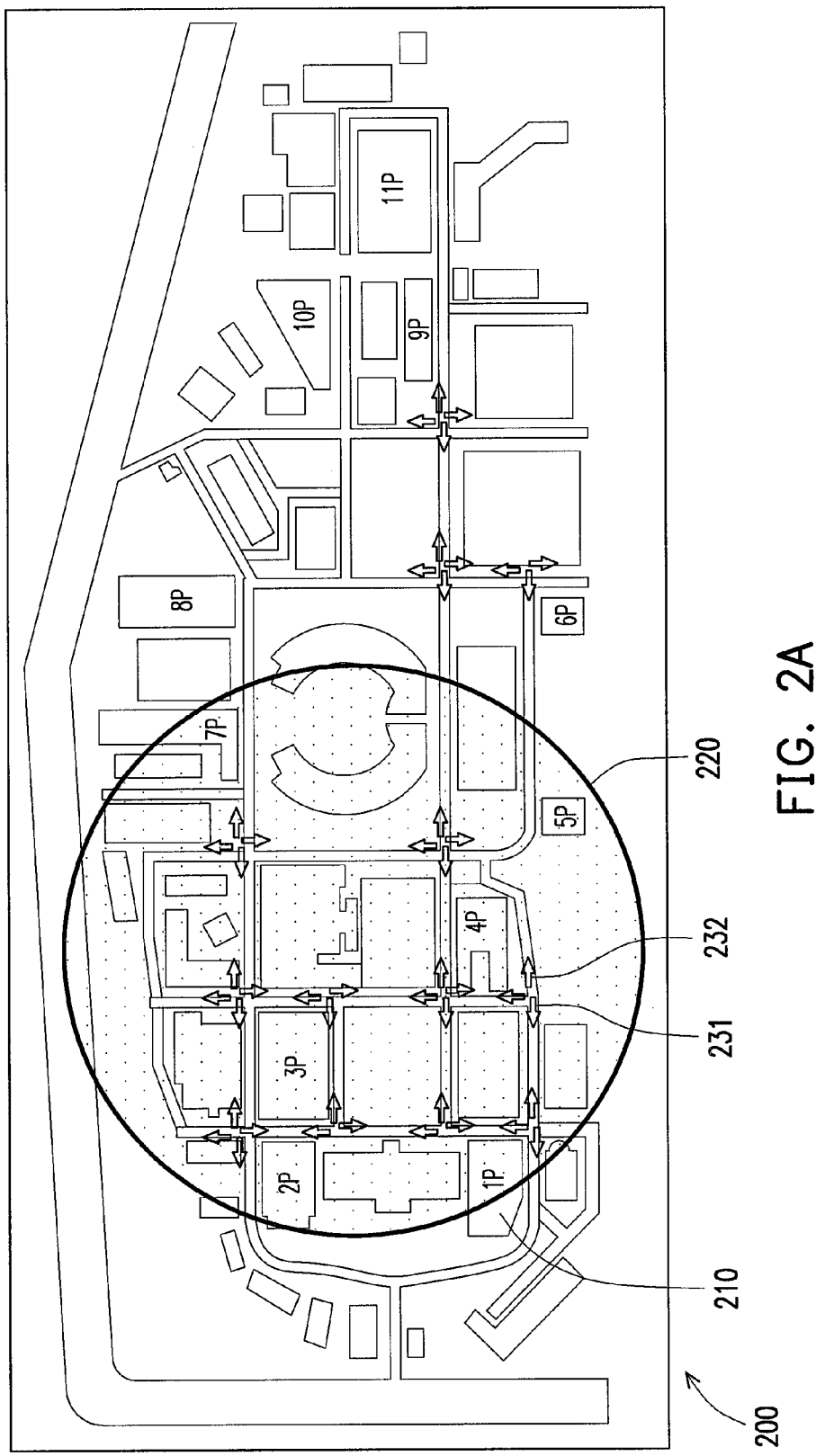
FIG. 2A is a schematic diagram of a method for object tracking according to an embodiment of the disclosure.
Figure 2B:
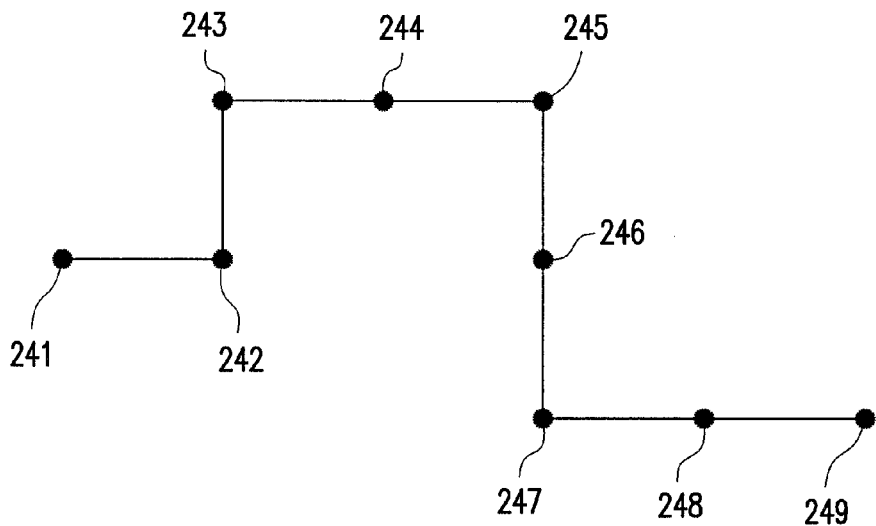
FIG. 2B and FIG. 2C are schematic diagrams illustrating moving tracks of a target object obtained according to a method for object tracking according to an embodiment of the disclosure.
Figure 2C:
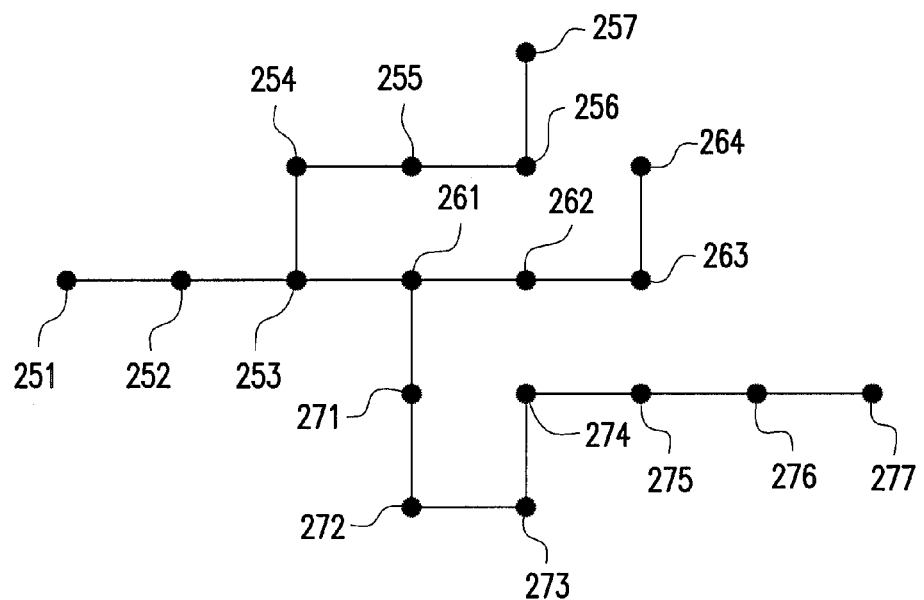

For example, FIG. 2B is an example of a set of discovered paths output according to the aforementioned method for object tracking. The initial object spot is indicated as 241 in a first round of analysis, and the found discovered object spot is indicated as 242. A line segment between the object spots 241 and 242 is a discovered path defined by the discovered object spot 242 and the corresponding initial object spot 241, and such discovered path is added to the set of discovered paths in the step 130. In a second round of analysis, the discovered object spot 242 becomes the initial object spot, and the found discovered object spot is indicated as 243. A line segment between the object spots 242 and 243 is a discovered path defined by the discovered object spot 243 and the corresponding initial object spot 242, and such discovered path is added to the set of discovered paths in the step 130. In a third round of analysis, the discovered object spot 243 becomes the initial object spot, and the found discovered object spot is indicated as 244. A line segment between the object spots 243 and 244 is a discovered path defined by the discovered object spot 244 and the corresponding initial object spot 243, and such discovered path is added to the set of discovered paths in the step 130. Deduced by analogy, a discovered object spot 249 is found in the last round of analysis, and the discovered paths in the set of discovered paths output in the step 150 form a moving track of the target object as that shown in FIG. 2B, and such moving track includes the object spots 241-249.

A plurality of discovered object spots are probably found in one round of analysis, which is probably due to lack of limitation conditions of the target object qualification, so that multiple objects in the set of surveillance data simultaneously match the target object qualification, or due to obscure or unclear of the surveillance data itself, so that multiple objects are simultaneously identified as the target object, which may cause a divergent moving track of the target object. For example, in an example of FIG. 2C, in a certain round of analysis, based on the initial object spot 253, two discovered object spots 254 and 261 are found, so that the moving track of the target object is diverged here. In another round of analysis, based on the initial object spot 261, two discovered object spots 262 and 271 are found, so that the moving track of the target object is again diverged. In this example, the discovered paths in the set of discovered paths output in the step 150 form three moving tracks of the target object as that shown in FIG. 2C, where the first moving track includes the object spots 251-257, the second moving track includes the object spots 251-253 and 261-264, and the third moving track includes the object spots 251-253, 261 and 271-277.

After the set of discovered paths is output in the step 150, the aforementioned method for object tracking can connect the discovered paths in the set of discovered paths as the moving track of the target object, or can present or output the moving track of the target object to the user in collaboration with an electronic map of the environment where the event spot locates and an output device such as a display or a printer, etc.

Figure 3:
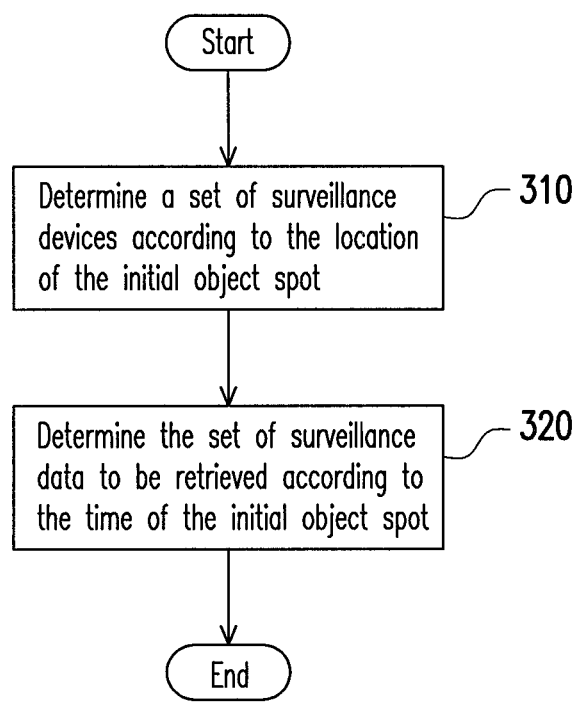
FIG. 3 to FIG. 5 are flowcharts of a method for object tracking according to an embodiment of the disclosure.

FIG. 3 is a flowchart illustrating detailed steps of the step 120 of FIG. 1. In order to determine the set of surveillance data corresponding to a certain initial object spot, in step 310, a set of surveillance devices corresponding to the initial object spot is first determined according to a location of the initial object spot. Then, in step 320, at least one segment of surveillance data of at least one surveillance device in the above set of surveillance devices is determined according to a time of the initial object spot. The set of surveillance data of the step S120 is formed by the at least one segment of surveillance data of at least one surveillance device in the above set of surveillance devices. The above set of surveillance devices and the set of surveillance data form a search pocket corresponding to the above initial object spot.

Figure 4:
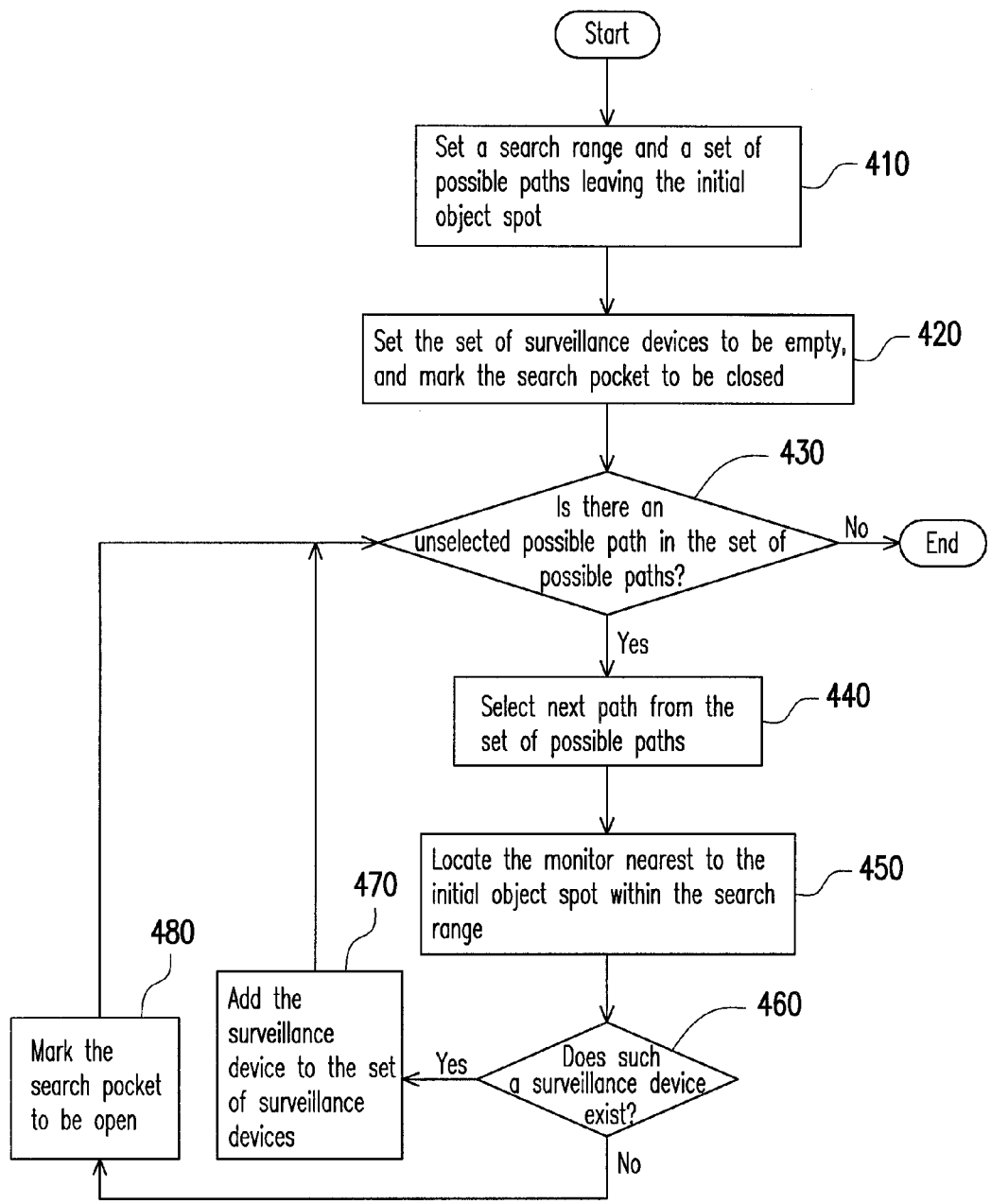

FIG. 4 is a flowchart illustrating detailed steps of the step 310 of FIG. 3. In order to determine the set of surveillance devices corresponding to a certain initial object spot, in step 410, a search range and a set of possible paths are first set. The search range is an enclosed area in the electronic map, and a distance between at least one location in the search range and the initial object spot does not exceed a predetermined threshold value. For example, the search range of the example of FIG. 2A is a circle 220, and the threshold value is a radius of the circle 220. In the electronic map 200 of FIG. 2A, an only exit of the parking lot 1P is located to the right side, so that the stolen car most likely pass by the search range 220.

The search range is not limited to be a circle, which can be an enclosed area of any shape. The search range can be manually set by the user, or can be set according to the method for object tracking of the embodiment. In case that the search range is set according to the method for object tracking, the initial object spot is, for example, taken as a center, and the predetermined threshold value is taken as a radius to form a circle, and the circle is taken as the search range. Alternatively, the search range can also be set according to a distribution of intersections nearby the initial object spot.

The set of possible paths in the step 410 is a set of at least one path that leaves the search range from the location of the initial object spot in the electronic map of the environment where the initial object spot locates. The paths in the set of possible paths are referred to as possible paths for distinguishing from the discovered paths in the aforementioned set of discovered paths.

Then, in step 420, the set of surveillance devices corresponding to the initial object spot is set to be empty, and the search pocket corresponding to the initial object spot is marked to be closed. Then, in step 430, it is checked whether there is any unselected possible path in the set of possible paths. If each of the possible paths in the set of possible paths has been selected, the flow is ended. Conversely, if there is any unselected possible path in the set of possible paths, a step 440 is executed, and the next possible path from the set of possible paths is selected. When the step 440 is executed for the first time, the first possible path in the set of possible paths is selected.

After the possible path is selected, in step 450, try to locate the surveillance device on the possible path that is nearest to the initial object spot within the search range, and in step 460, it is checked whether such surveillance device exists. If such surveillance device exists, in step 470, the surveillance device found in the step 450 is added to the set of surveillance devices corresponding to the initial object spot, and then the flow returns to the step 430. If no surveillance device is found in the step 450, it represents that the possible path has no surveillance device within the search range, and in step 480, the search pocket corresponding to the initial object spot is marked to be open, and then the flow returns to the step 430.

In the present embodiment, the tracking analysis result output by the step 150 of FIG. 1 may also include an open/closed mark of the search pocket. The marks of the search pocket can be used to represent reliability of the tracking result of the target object. If each search pocket is marked to be closed, it represent that in the analysis process of each initial object spot, each possible path is installed with a surveillance device within the search range, and the tracking result of the target object is completely reliable. If at least one search pocket is marked to be open, it represents that the target object can leave the search range through at least one possible path without being monitored, and such tracking result is not completely reliable.

Figure 5:
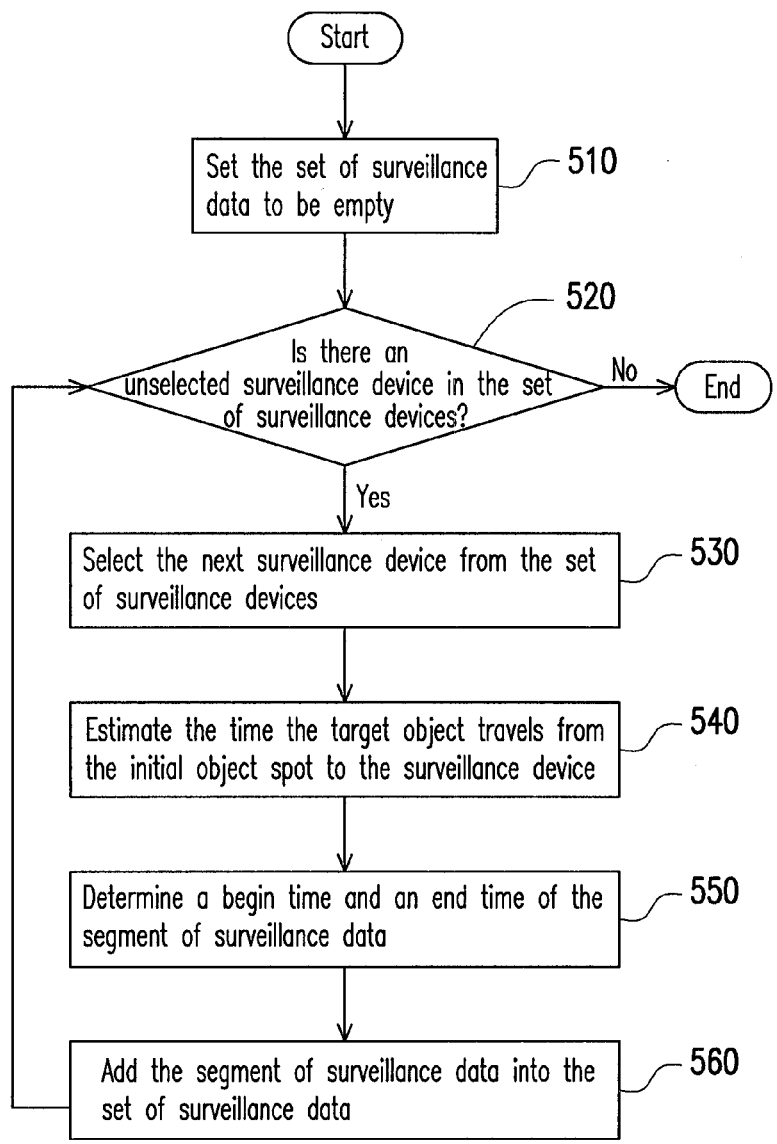

After the set of surveillance devices corresponding to a certain initial object spot is determined in the step 310 of FIG. 3, the set of surveillance data corresponding to the initial object spot can be further determined in the step 320 of FIG. 3. FIG. 5 is a flowchart illustrating detailed steps of the step 320 of FIG. 3. First, in step 510, the set of surveillance data is set to be empty, and then in step 520, it is checked whether the set of surveillance devices corresponding to the initial object spot has any unselected surveillance device. If each of the surveillance devices in the set of surveillance devices has been selected, the flow is ended, and if the set of surveillance devices has unselected surveillance device, in step 530, a next surveillance device in the set of surveillance devices is selected. If the step 530 is executed for the first time, the first surveillance device of the set of surveillance devices is selected.

Then, in step 540, the time the target object travels from the initial object spot to the surveillance device (the travelling time of the target object) is estimated. Such travelling time can be a predetermined value set by the user, or can be estimated according to the method for object tracking of the embodiment. In case that the travelling time is estimated according to the method for object tracking of the embodiment, a travelling speed of the target object from the initial object spot to the surveillance device is first estimated, and then the travelling time is estimated according to a distance between the initial object spot and the surveillance device and the above travelling speed.

The distance between the initial object spot and the surveillance device can be obtained from the electronic map. The travelling speed of the target object can be a predetermined value, for example, if the target object is people, a pre-measured average speed of a pedestrian can be taken as the travelling speed of the target object. If the target object is a vehicle such as a motorcycle or a car, etc., a pre-measured average car speed on the road from the initial object spot to the surveillance device can be taken as the travelling speed of the target object. If the target object is the aforementioned vehicle, a highest speed limit of the road from the initial object spot to the surveillance device can be obtained from the electronic map to serve as the travelling speed of the target object. By dividing the distance between the initial object spot and the surveillance device by the travelling speed of the target object, the travelling time of the target object from the initial object spot to the surveillance device is obtained.

Then, in step 550, according to the time of the initial object spot itself and the aforementioned estimated travelling time of the target object, a begin time and an end time of the segment of surveillance data of the surveillance device are determined. A general method thereof is as follows. The time of the initial object spot itself can be a time range, which has a begin time and an end time respectively represented by $T_{SB}$ and $T_{SE}$. The travelling time of the target object may have a lower limit and an upper limit, which are respectively represented by $T_{TMIN}$ and $T_{TMAX}$. It is assumed that the travelling time of the target object that is estimated by the step 540 is $T_T$, and two ratios $R_A$ and $R_B$ are predetermined, where $R_A$ is smaller than $R_B$. $R_A$ and $R_B$ are all real numbers, which can be smaller than one or greater than one. Then, $T_{TMIN}$ is set to be $T_T \times R_A$, and $T_{TMAX}$ is set to be $T_T \times R_B$. Then, the begin time of the segment of surveillance data of the surveillance device is set as $T_{SB}+T_{TMIN}$, and the end time of the segment of surveillance data of the surveillance device is set as $T_{SE}+T_{TMAX}$.

The time of the initial object spot itself can also be a single moment, and in this case, $T_{SB}=T_{SE}$. The travelling time of the target object can also be a single moment, and in this case, $R_A$ and $R_B$ are all equal to one, i.e. $T_T=T_{TMIN}=T_{TMAX}$.

Then, in step 560, the segment of surveillance data is added to the set of surveillance data to be retrieved, and then the flow returns to the step 520. Namely, during a retrieving process of the step 125, only the segment from a time $T_{SB}+T_{TMIN}$ to a time $T_{SE}+T_{TMAX}$ in the surveillance data of the surveillance device is retrieved.

Figure 6:
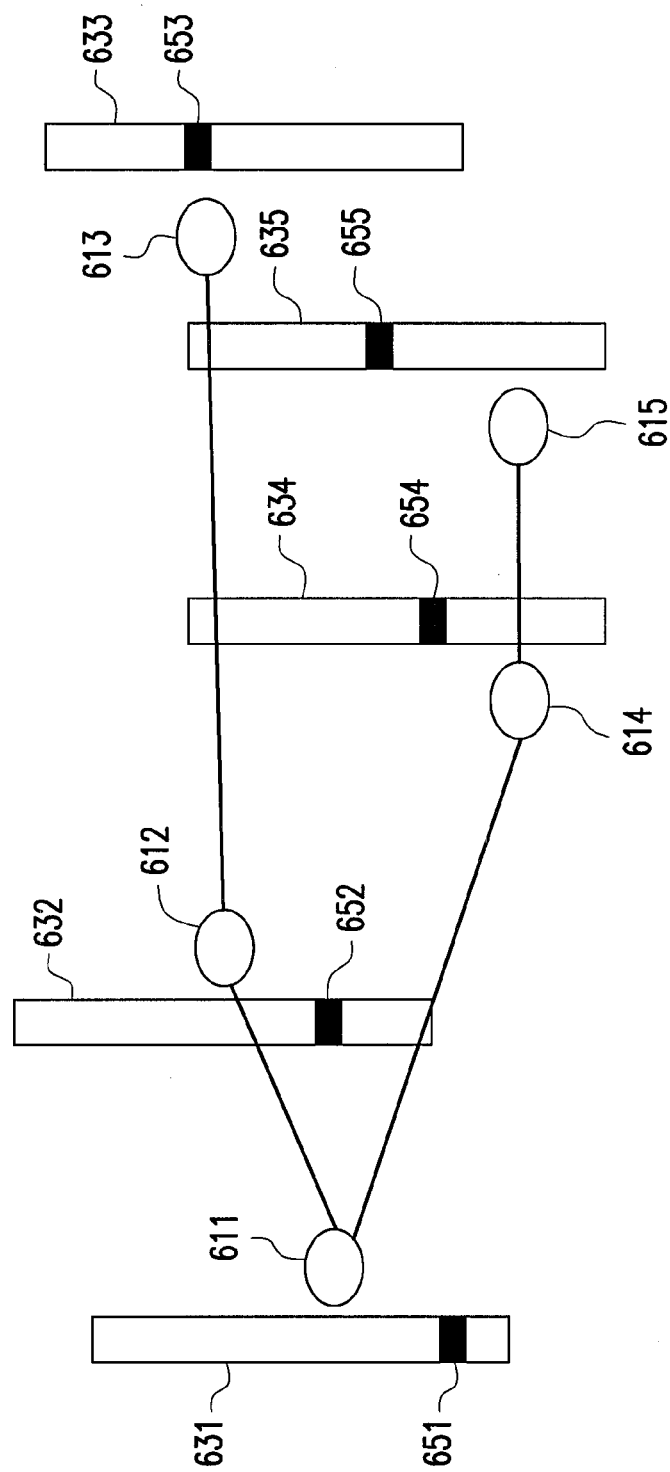
FIG. 6 is a schematic diagram of a set of surveillance data obtained in a method for object tracking according to an embodiment of the disclosure.

FIG. 6 is a schematic diagram of a set of surveillance data obtained in the method for object tracking of the present embodiment. In FIG. 6, five surveillance devices 611-615 are illustrated. The surveillance data recorded by the surveillance devices 611-615 are respectively 631-635. Segments of surveillance data 651-655 in the surveillance data 631-635 form the set of surveillance data. In the surveillance data 631-635, the upper part represents the surveillance data of the later time. As described above, the method for object tracking of the present embodiment can determine the surveillance devices from which the surveillance data is retrieved according to the location of the initial object spot and the surrounding electronic map of the initial object spot. It is unnecessary to retrieve all surveillance data in these surveillance devices, but only a small segment of the surveillance data in at least one of the surveillance devices is retrieved according to the time of the initial object spot itself and the travelling speed of the target object. Time of these segments of surveillance data is shifted backwards as a distance between the surveillance device and the initial object spot increases. As shown in FIG. 6, only the set of surveillance data formed by the segments of surveillance data 651-655 is required to be retrieved and analysed, which is far less than a total data amount of the surveillance data 631-635.

Other embodiments of the disclosure provide a computer program product and a non-transitory computer-readable recording medium. The computer program product is adapted to an object tracking system, for example, an object tracking system 700 shown in FIG. 7. When the object tracking system loads and executes a computer program of the computer program product, the aforementioned method for object tracking is implemented. The non-transitory computer-readable recording medium stores a computer program, and when a computer loads and executes the computer program, the aforementioned method for object tracking is implemented. The aforementioned computer can be an analyser 710 of the object tracking system 700 of FIG. 7, or can be a computer having the same function.

Figure 7:
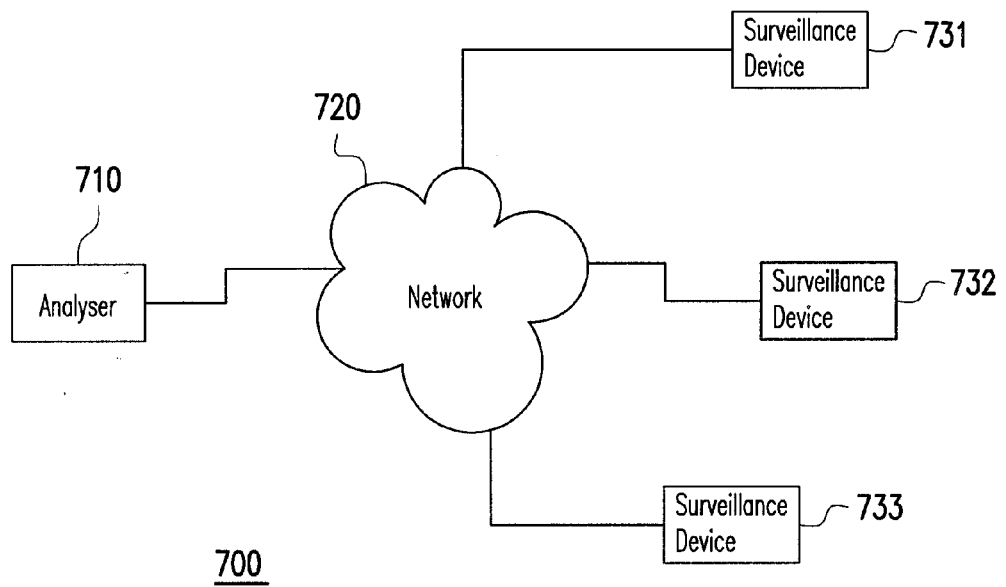
FIG. 7 is a schematic diagram of an object tracking system according to an embodiment of the disclosure.

FIG. 7 is a schematic diagram of the object tracking system 700 according to an embodiment of the disclosure. The object tracking system 700 includes the analyser 710 and a plurality of surveillance devices, for example, surveillance devices 731-733. The analyser 710 is coupled to the surveillance devices of the object tracking system 700 through a network 720. The network 720 can be a cable network or a wireless network, or a combination thereof. The analyser 710 can be a personal computer or a server, which is used for executing the method for object tracking of the aforementioned embodiment. Details of the analyser 710 have been described in the aforementioned embodiment, which are not repeated therein.

FIG. 8A to FIG. 8F illustrate a tracking example of the method for object tracking or the object tracking system. Taking the campus car theft case of FIG. 2A as an example, where 200 is the electronic map of the campus, 210 is the initial object spot, which represents the location and time of the car theft, and the circle 220 is the search range. The only exit of the parking lot 1P is located to the right, so that the stolen car most likely pass by the search range 220. Each arrow in the electronic map 200 represents a surveillance device, which is, for example, a video camera, and an arrow direction represents the surveillance direction of the surveillance device. The analyser in a data center 804 is coupled to the surveillance devices within the search range 220 through the network 802, so as to retrieve and analyse the required surveillance data.

Figure 8A:
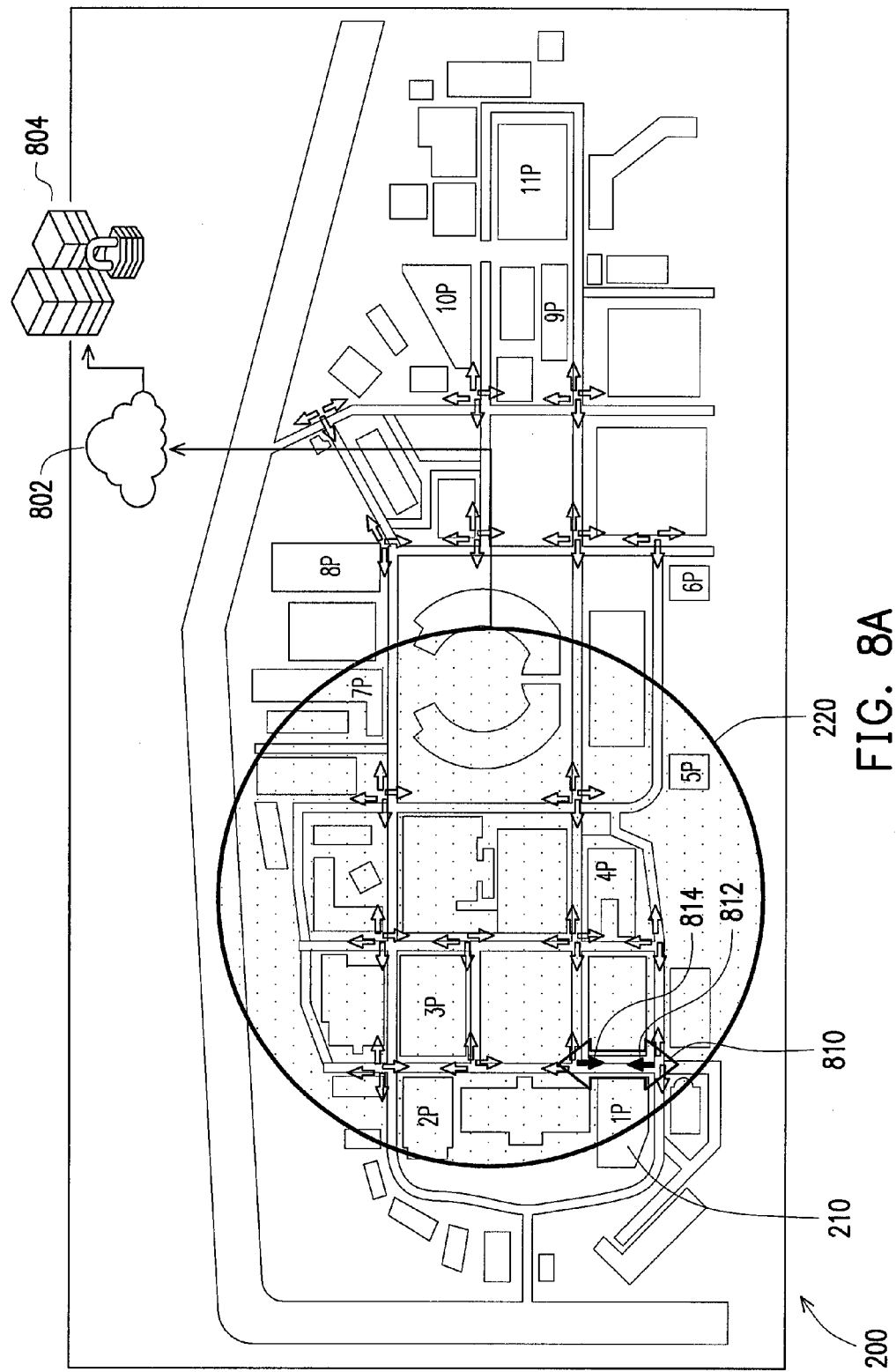
FIG. 8A to FIG. 8F illustrate a tracking example of a method for object tracking or an object tracking system according to an embodiment of the disclosure.

As shown in FIG. 8A, the initial object spot 210 is analysed to obtain a search pocket 810, where the search pocket 810 includes two surveillance devices 812 and 814 indicated by solid arrows. In this example, a time of the car theft is probably between 7 p.m and 6 a.m, and the time range is 11 hours long, and the analyser of the data center 804 has to respectively retrieve the segment of surveillance data of 11 hours from the surveillance devices 812 and 814, so that the surveillance data of total 22 hours has to be analysed.

Figure 8B:
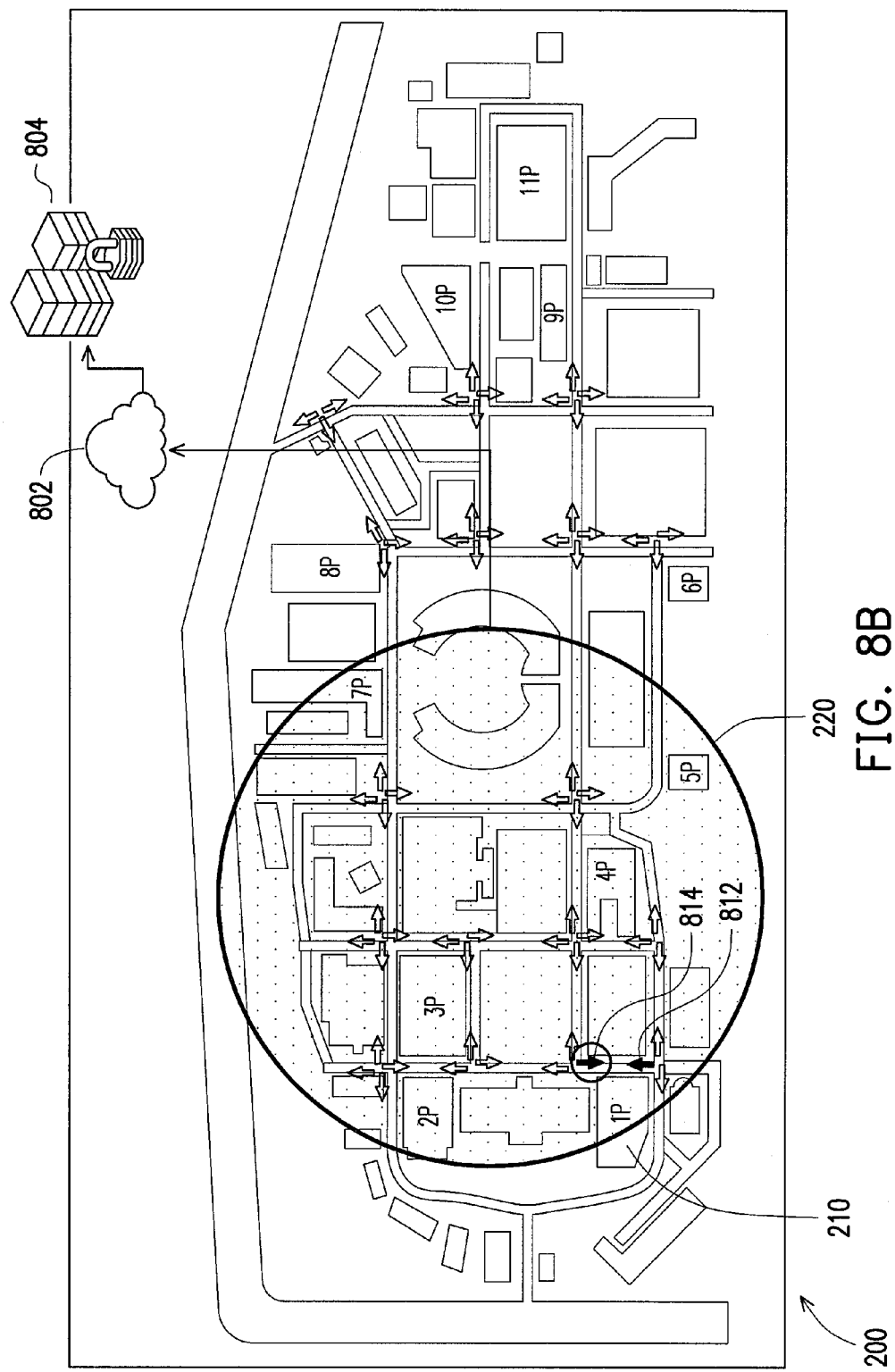

As shown in FIG. 8B, after analysis, it is discovered that the stolen car only appears in the surveillance data of the surveillance device 814, so that the location of the surveillance device 814 and the appearance time of the stolen car become the discovered object spot, which is added to the set of discovered object spots.

Figure 8C:
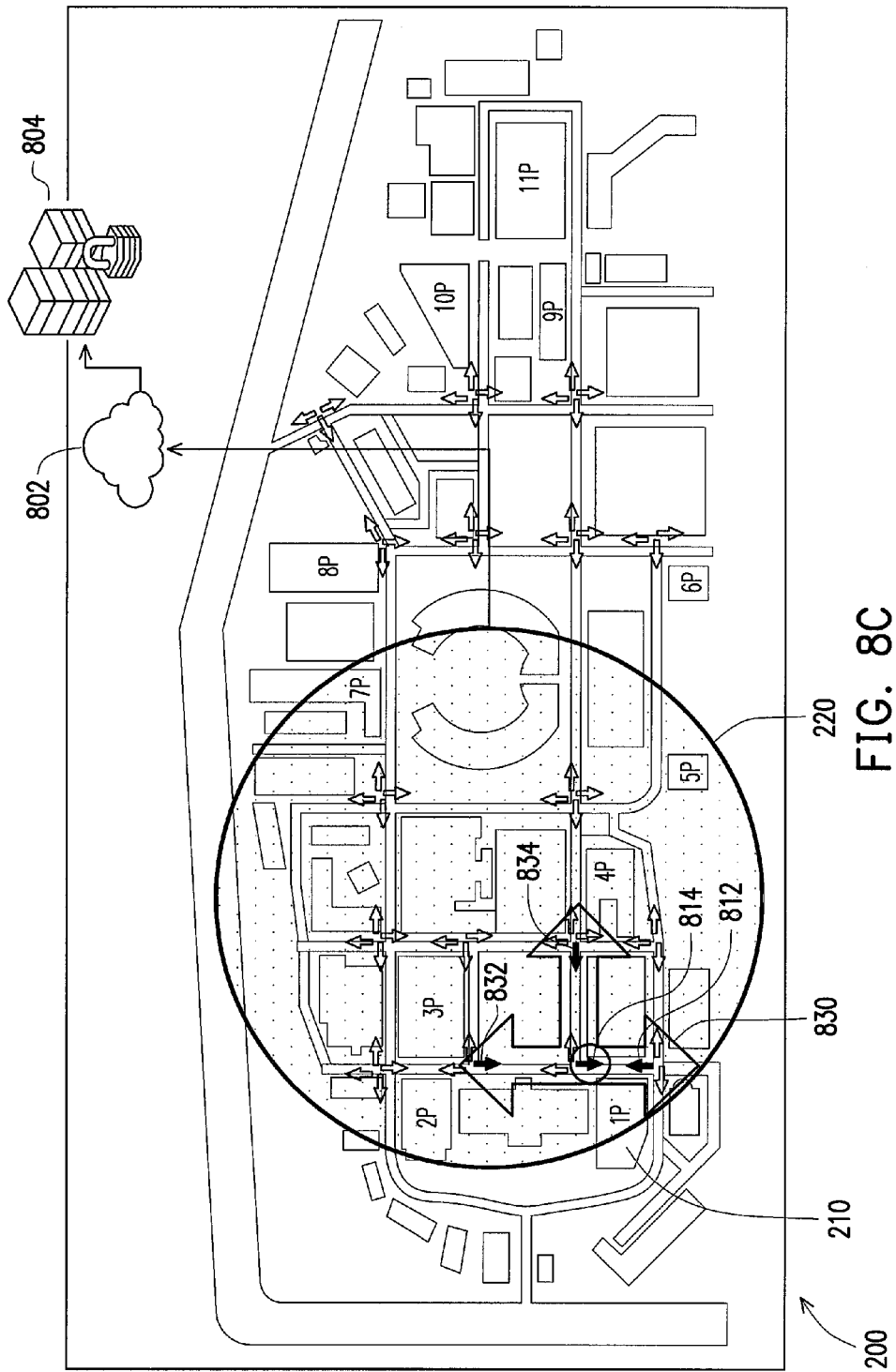

In a next round of analysis, as shown in FIG. 8C, the initial object spot 814 is analysed to obtain the search pocket 830, where the search pocket 830 includes three surveillance devices 832, 834 and 812 indicated by solid arrows. Since a time that the stolen car appears in the surveillance data of the surveillance device 814 is very short, and the surveillance devices 832, 834 and 812 are very close to the initial object spot 814, the analyser only retrieves a segment of surveillance data of one minute from each of the surveillance devices 832, 834 and 812, so that the surveillance data of total three minutes is required to be analysed. The data amount of three minutes of this round of analysis is obviously less than the data amount of 22 hours of the last round of analysis.

Figure 8D:
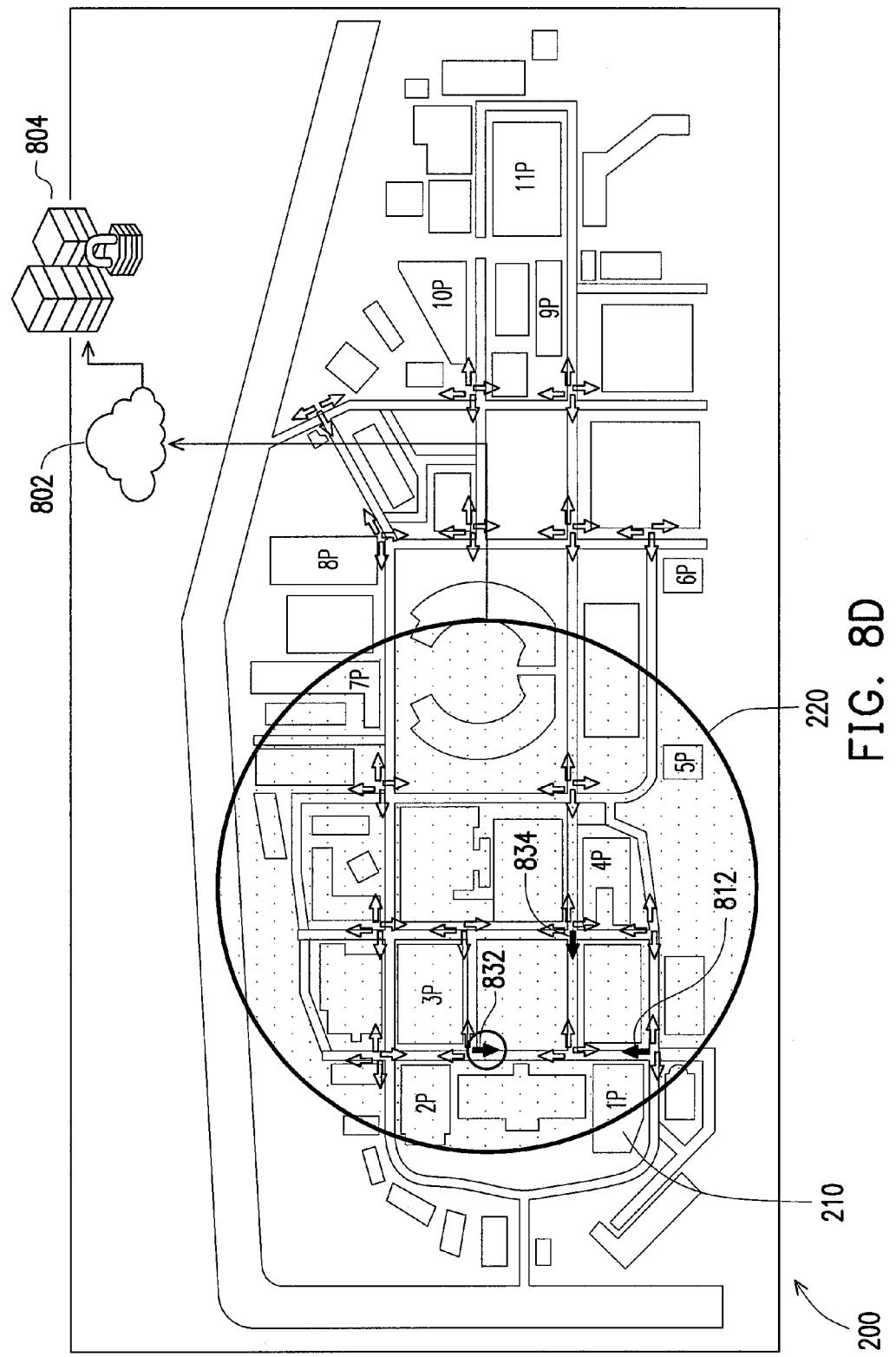

Then, as shown in FIG. 8D, after analysis, it is discovered that the stolen car only appears in the surveillance data of the surveillance device 832, so that the location of the surveillance device 832 and the appearance time of the stolen car become the discovered object spot, which is added to the set of discovered object spots.

Figure 8E:
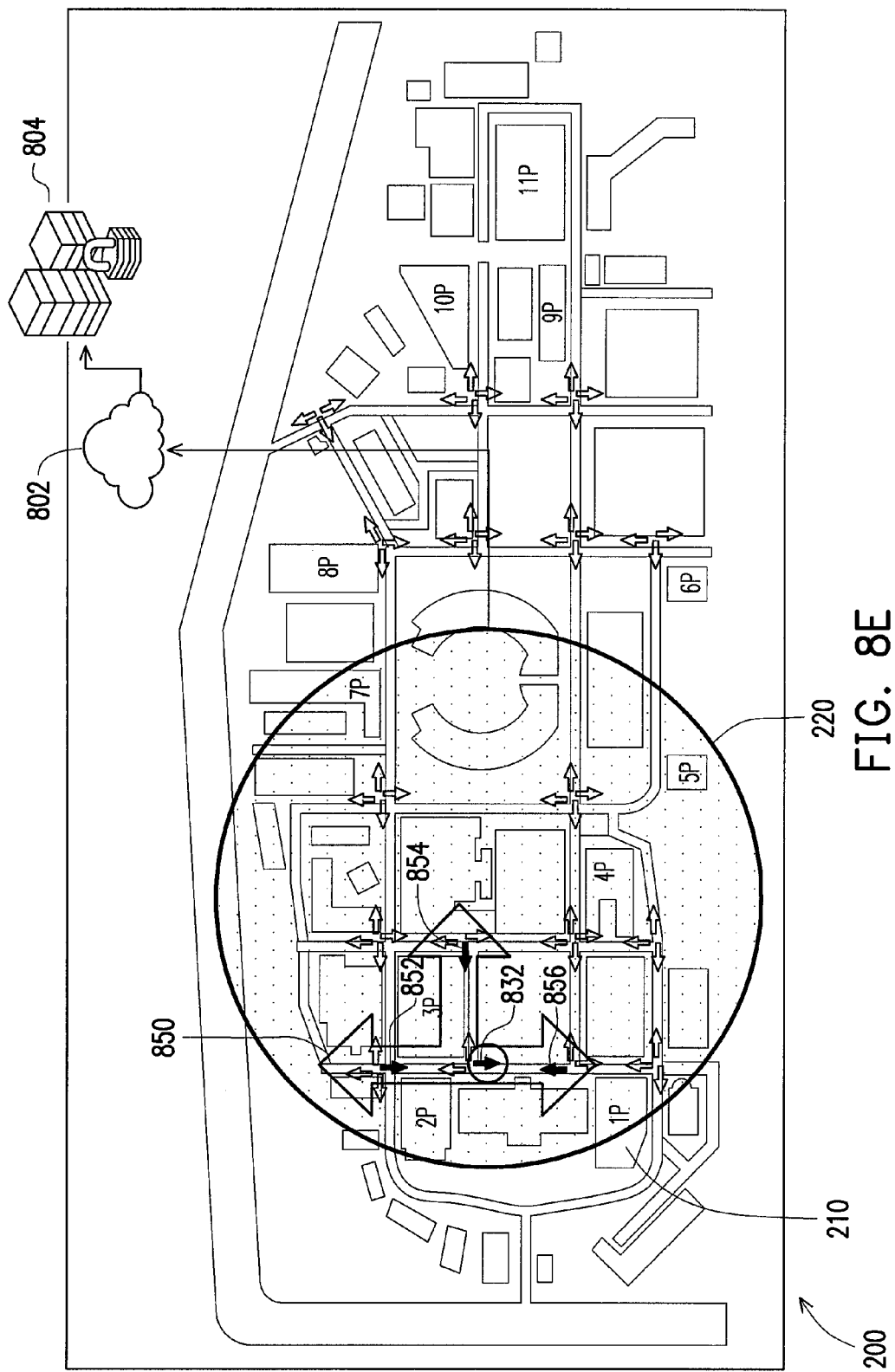
Figure 8F:
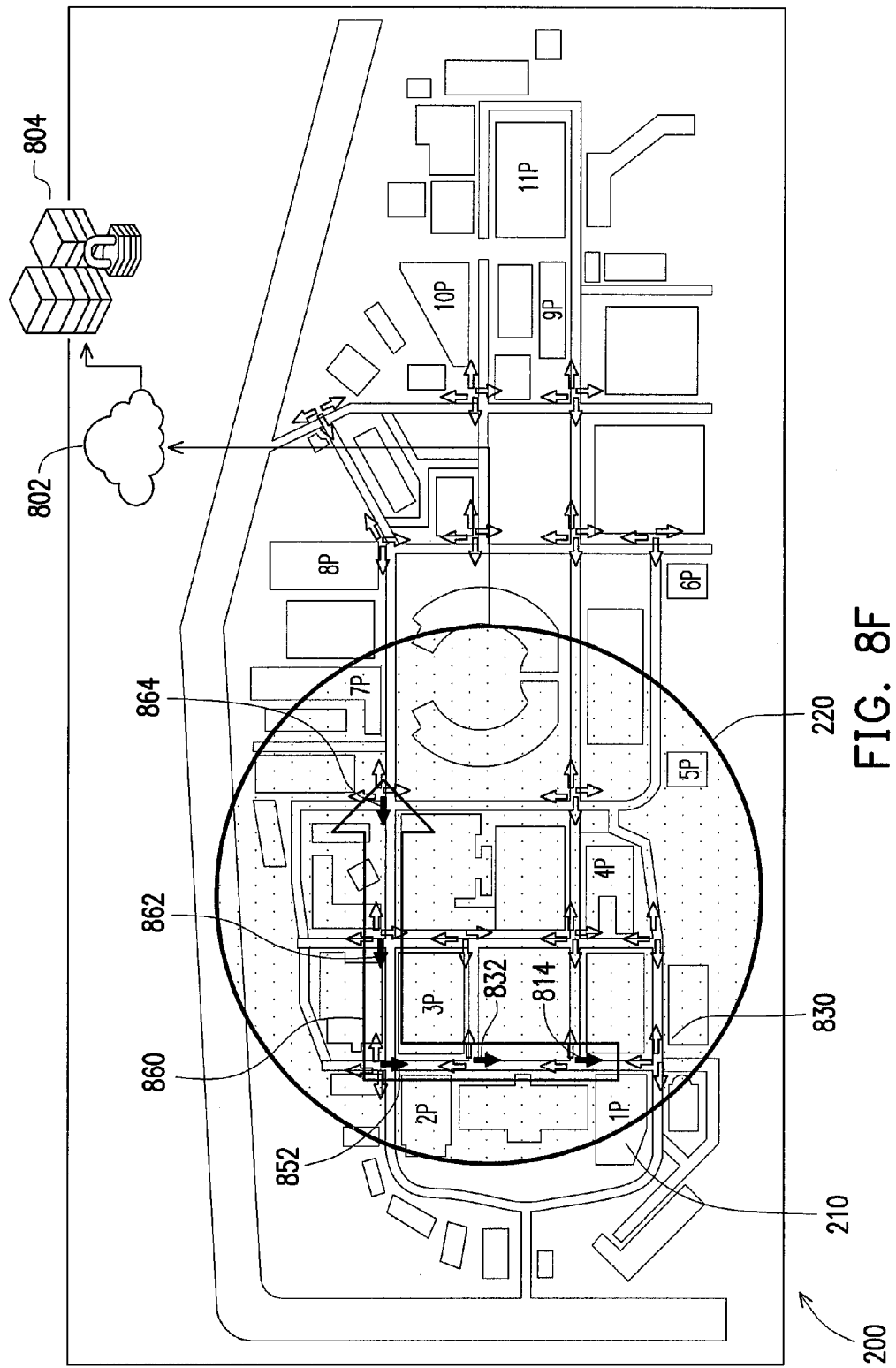

In a next round of analysis, as shown in FIG. 8E, the initial object spot 832 is analysed to obtain the search pocket 850, where the search pocket 850 includes three surveillance devices 852, 854 and 856 indicated by solid arrows. Since a time that the stolen car appears in the surveillance data of the surveillance device 832 is very short, and the surveillance devices 852, 854 and 856 are very close to the initial object spot 832, the analyser only retrieves a segment of surveillance data of one minute from each of the surveillance devices 852, 854 and 856, so that the surveillance data of total three minutes is required to be analysed.

The following analysis can be deduced by analogy, as shown in the flowchart of FIG. 1, the analysis loop is ended when the set of discovered object spots does not has the discovered object spot. Now, all of the discovered object spots found during the analysis process can be connected to the discovered paths defined by the corresponding initial object spots, and in collaboration with the electronic map 200, a moving track 860 of the target object is displayed in FIG. 8F. Locations of the discovered object spots are the locations of the surveillance devices 814, 832, 852, 862 and 864 indicated by solid arrows, which represent the locations where the stolen car ever appeared, and a time sequence of the discovered object spots is shown as an arrow direction of the moving track 860, which represents a moving track of the stolen car. The moving track 860 of the target object can be used an investigation clue, or used as a basis for further object tracking analysis.

In summary, according to the method for object tracking, the object tracking system and the corresponding computer program product and non-transitory computer-readable recording medium of the aforementioned embodiments, in the distributed surveillance data storage environment, the set of surveillance devices and the set of surveillance data corresponding to the initial object spot are determined. The set of surveillance devices avails avoiding retrieving and analysis of surveillance data of the surveillance devices departed from the moving track of the target object, and the set of surveillance data avails avoiding retrieving and analysis of surveillance data having a great difference with the travelling time of the target object. Therefore, method for object tracking, the object tracking system, the computer program product and the non-transitory computer-readable recording medium of the aforementioned embodiments can avoid retrieving a large amount data of a large range, which can effectively reduce the amount of the surveillance data retrieved from the distributed surveillance devices. Since the retrieved and analysed data amount is reduced, a bottleneck effect of a general network bandwidth is mitigated, which improves retrieving efficiency of the surveillance data and reduces a computation amount, and identification and tracking of the target object are speed up.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for object tracking, adapted to an object tracking system, and the method for object tracking comprising:
    setting a set of discovered paths to be empty;
    determining a set of surveillance data corresponding to at least one initial object spot in a set of initial object spots according to a location and a time of the initial object spot;
    retrieving one or a plurality of segments of surveillance data in the set of surveillance data;
    finding at least one discovered object spot matching a target object qualification of a target object in the set of surveillance data, adding the at least one discovered object spot into a set of discovered object spots, and adding a discovered path defined by the discovered object spot and the initial object spot corresponding to the discovered object spot into the set of discovered paths when the at least one discovered object spot is found;
    setting the set of initial object spots to be the set of discovered object spots and returning to the step of determining the set of surveillance data when the set of discovered object spots is not empty; and
    outputting the at least one discovered object spot and the set of discovered paths when the set of discovered object spots is empty.

2. The method for object tracking as claimed in claim 1, wherein the step of determining the set of surveillance data comprises:
    determining a set of surveillance devices corresponding to the initial object spot according to the location of the initial object spot; and
    determining at least one segment of surveillance data of at least one surveillance device in the set of surveillance devices according to the time of the initial object spot, wherein the set of surveillance data is formed by the at least one segment of surveillance data of the at least one surveillance device in the set of surveillance devices.

3. The method for object tracking as claimed in claim 2, wherein the step of determining the set of surveillance devices comprises:
    determining a set of possible paths, wherein the set of possible paths comprises at least one possible path that leaves a search range from the location of the initial object spot in an electronic map; and
    regarding each of the possible paths, locating a surveillance device on the possible path that is nearest to the initial object spot within the search range, wherein the set of surveillance devices is formed by the surveillance devices nearest to the initial object spot.

4. The method for object tracking as claimed in claim 3, wherein the search range is an enclosed area in the electronic map, and a distance between at least one location in the search range and the initial object spot does not exceed a threshold value.

5. The method for object tracking as claimed in claim 3, wherein the set of surveillance devices and the set of surveillance data form a search pocket corresponding to the initial object spot, and the method for object tracking further comprises:
    marking the search pocket to be closed;
    marking the search pocket to be open when at least one of the possible paths has no surveillance device within the search range; and
    outputting the mark of the search pocket when the set of discovered object spots is empty.

6. The method for object tracking as claimed in claim 2, further comprising:
    estimating a travelling time of the target object from the initial object spot to the at least one surveillance device in the set of surveillance devices; and
    regarding the surveillance device in the set of surveillance devices, determining a begin time and an end time of the segment of surveillance data of the surveillance device according to the time of the initial object spot and the travelling time.

7. The method for object tracking as claimed in claim 6, wherein the step of estimating the travelling time comprises:
    estimating a travelling speed of the target object from the initial object spot to the at least one surveillance device in the set of surveillance devices; and
    regarding the surveillance device in the set of surveillance devices, estimating the travelling time according to a distance between the initial object spot and the surveillance device and the travelling speed.

8. The method for object tracking as claimed in claim 2, wherein a location of the at least one of the discovered object spots is a location of the surveillance device that records the segment of surveillance data where the at least one discovered object spot belongs.

9. The method for object tracking as claimed in claim 1, wherein a location of the at least one of discovered object spots is a location where the target object appears in the segment of surveillance data where the at least one discovered object spot belongs.

10. The method for object tracking as claimed in claim 1, wherein a time of the at least one of the discovered object spots is a time when the target object appears in the segment of surveillance data where the at least one discovered object spot belongs.

11. A non-transitory computer-readable recording medium, storing a computer program, wherein when a computer loads and executes the computer program, the aforementioned method for object tracking as claimed in claim 1 is implemented.

12. An object tracking system, comprising:
    a plurality of surveillance devices; and
    an analyser, coupled to the surveillance devices through a network, wherein the analyser sets a set of discovered paths to be empty, the analyser determines a set of surveillance data corresponding to at least one initial object spot in a set of initial object spots according to a location and a time of the initial object spot, the analyser retrieves one or a plurality of segments of surveillance data in the set of surveillance data from the surveillance devices, the analyser finds at least one discovered object spot matching a target object qualification of a target object in the set of surveillance data, adds the at least one discovered object spot into a set of discovered object spots, and adds a discovered path defined by the discovered object spot and the initial object spot corresponding to the discovered object spot into the set of discovered paths when the analyser finds the at least one discovered object spot, the analyser sets the set of initial object spots to be the set of discovered object spots and returns to the step of determining the set of surveillance data when the set of discovered object spots is not empty, and the analyser outputs the at least one discovered object spot and the set of discovered paths when the set of discovered object spots is empty.

13. The object tracking system as claimed in claim 12, wherein the analyser determines a set of surveillance devices corresponding to the initial object spot according to the location of the initial object spot, and determines at least one segment of surveillance data of at least one surveillance device in the set of surveillance devices according to the time of the initial object spot, wherein the set of surveillance data is formed by the at least one segment of surveillance data of the at least one surveillance device in the set of surveillance devices.

14. The object tracking system as claimed in claim 13, wherein the analyser determines a set of possible paths, wherein the set of possible paths comprises at least one possible path that leaves a search range from the location of the initial object spot in an electronic map, and regarding each of the possible paths, the analyser locates a surveillance device on the possible path that is nearest to the initial object spot within the search range, wherein the set of surveillance devices is formed by the surveillance devices nearest to the initial object spot.

15. The object tracking system as claimed in claim 14, wherein the search range is an enclosed area in the electronic map, and a distance between at least one location in the search range and the initial object spot does not exceed a threshold value.

16. The object tracking system as claimed in claim 14, wherein the set of surveillance devices and the set of surveillance data form a search pocket corresponding to the initial object spot, and the analyser marks the search pocket to be closed, when at least one of the possible paths has no surveillance device within the search range, the analyser marks the search pocket to be open, and when the set of discovered object spots is empty, the analyser outputs the mark of the search pocket.

17. The object tracking system as claimed in claim 13, wherein the analyser estimates a travelling time of the target object from the initial object spot to at least one surveillance device in the set of surveillance devices, and regarding the surveillance device in the set of surveillance devices, the analyser determines a begin time and an end time of the segment of surveillance data of the surveillance device according to the time of the initial object spot and the travelling time.

18. The object tracking system as claimed in claim 17, wherein the analyser estimates a travelling speed of the target object from the initial object spot to at least one surveillance device in the set of surveillance devices, and regarding the surveillance device in the set of surveillance devices, the analyser estimates the travelling time according to a distance between the initial object spot and the surveillance device and the travelling speed.

19. The object tracking system as claimed in claim 13, wherein a location of at least one of the discovered object spots is a location of the surveillance device that records the segment of surveillance data where the discovered object spot belongs.

20. The object tracking system as claimed in claim 12, wherein a location of at least one of the discovered object spots is a location where the target object appears in the segment of surveillance data where the discovered object spot belongs.

21. The object tracking system as claimed in claim 12, wherein a time of the at least one of the discovered object spot is a time when the target object appears in the segment of surveillance data where the discovered object spot belongs.

* * * * *